United States Patent [19]
Choksi et al.

[11] 3,923,179
[45] Dec. 2, 1975

[54] MEDICAL LIQUID CONTAINER WITH TACTILE STERILITY INDICATOR AND METHOD OF TESTING CONTAINER

[75] Inventors: Pradip V. Choksi, North Hollywood; Roy B. Steidley, Seal Beach, both of Calif.

[73] Assignee: American Hospital Supply Corporation, Evanston, Ill.

[22] Filed: Mar. 7, 1973

[21] Appl. No.: 338,661

[52] U.S. Cl. ............ 215/203; 215/1 R; 215/DIG. 3; 215/251
[51] Int. Cl. .......................................... B65d 55/02
[58] Field of Search ..... 215/46 A, 42, 37 R, DIG. 3, 215/1 C, 203; 220/27; 401/132, 133; 40/310

[56] References Cited
UNITED STATES PATENTS

| | | | |
|---|---|---|---|
| 2,040,798 | 5/1936 | Schoonmaker | 215/37 R |
| 2,851,201 | 9/1958 | Poitras | 215/DIG. 3 |
| 3,025,988 | 3/1962 | Williams | 215/32 X |
| 3,393,818 | 7/1968 | McIntosh | 215/56 |
| 3,394,831 | 7/1968 | Bathish et al. | 215/38 R X |
| 3,443,711 | 5/1969 | Olson | 215/7 |
| 3,517,847 | 6/1970 | Guala | 215/42 |
| 3,730,372 | 5/1973 | Komendowski | 215/30 |

*Primary Examiner*—Herbert F. Ross
*Attorney, Agent, or Firm*—Larry N. Barger; Robert T. Merrick

[57] ABSTRACT

A container for sterile medical liquids that has a double cap sealed closure system. A deformable thermoplastic top wall of an outer cap is spaced a distance from a top wall of an inner cap when properly sterilized. Thumb pressure on the outer cap brings the top walls of the two caps into contact. This contact provides an instant tactile test for determining that the container has been through a steam sterilization cycle and there are no leaks at the inner and outer cap seals with the bottle.

8 Claims, 6 Drawing Figures

MEDICAL LIQUID CONTAINER WITH TACTILE STERILITY INDICATOR AND METHOD OF TESTING CONTAINER

BACKGROUND

Sterile medical liquids such as normal saline, 5% dextrose, sterile water, etc., are often bottled and sterilized by manufacturers and then shipped to hospitals. The bottles remain unopened until immediately ready to administer sterile irrigating liquids to a surgical wound or to give an intravenous feeding to a patient, etc.

It is highly critical to have a test to insure that the closed containers have been properly sterilized. Sterilization is often accomplished by subjecting the closed seal containers to steam autoclaving at 240° to 260° F (116° to 127° C). When the bottles are of rigid glass they are often evacuated and utilize a thin rubber disc over an opening in the container outlet as a sterility indicator. The evacuated interior of the bottle creates a visual dimple in the rubber disc for indicating the integrity of the bottle seals and sterility of the contents.

However, when a semi-rigid or collapsible thermoplastic bottle or bag is used for storing and dispensing the sterile medical liquids evacuation is not practical. Evacuation of such thermoplastic containers that have an air space above the liquid would cause such containers to collapse. Therefore it is necessary to provide an indicator that shows the bottle has been through the autoclave and also that the closure seals are intact. This invention relates to such a sterility indicator for a non-evacuated sterile medical liquid container.

SUMMARY OF THE INVENTION

This invention provides a special double closure system for a non-evacuated thermoplastic container for sterile medical liquids. This closure system has an inner closure that hermetically seals off a dispensing neck. This inner closure can be either a screw cap as in a pouring container or a transverse coupling head for connecting to an intravenous administration set. Fitting over this inner closure is a thermoplastic cap that is hermetically sealed to the thermoplastic container. There is a small controlled volume of air sealed between the inner closure and outer cap which are spaced a small distance from each other.

After the container and closure system has been subjected to steam sterilization temperatures and pressures and cooled to room temperature, the outer cap is permanently deformed but has a top wall that remains spaced from the inner cap. Thumb pressure on the center of the outer cap top wall will bring this top wall into contact with the top wall of the inner closure. When this is done there is a springy feel to this deflection of the outer cap's top wall. This is because of the small volume of sealed air space between the outer cap and the inner closure, and the relief of molded in stresses by the sterilization cycle. When an operator feels this spring back characteristic of the outer cap this indicates that the bottle has been through the sterilization cycle and does not have a leak.

If there has been an outer cap leak, or either a permanent or temporary inner cap leak, the condition of the outer cap when pushed in and its reaction will indicate the particular type of leak. Such defective bottle should be discarded.

THE DRAWINGS

DETAILED DESCRIPTION

Figure 1:
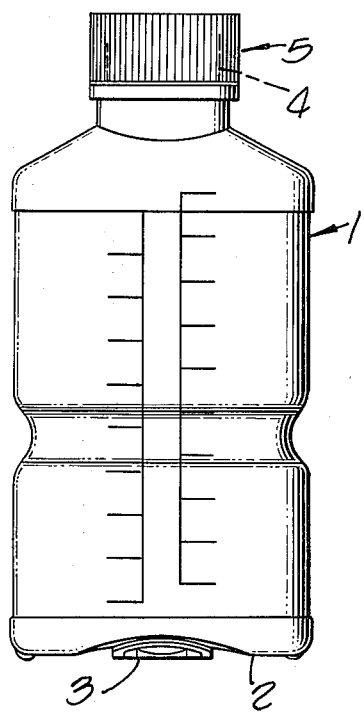
FIG. 1 is a front elevational view of the sealed container as it is shipped and stored ready for use.
Figure 4:
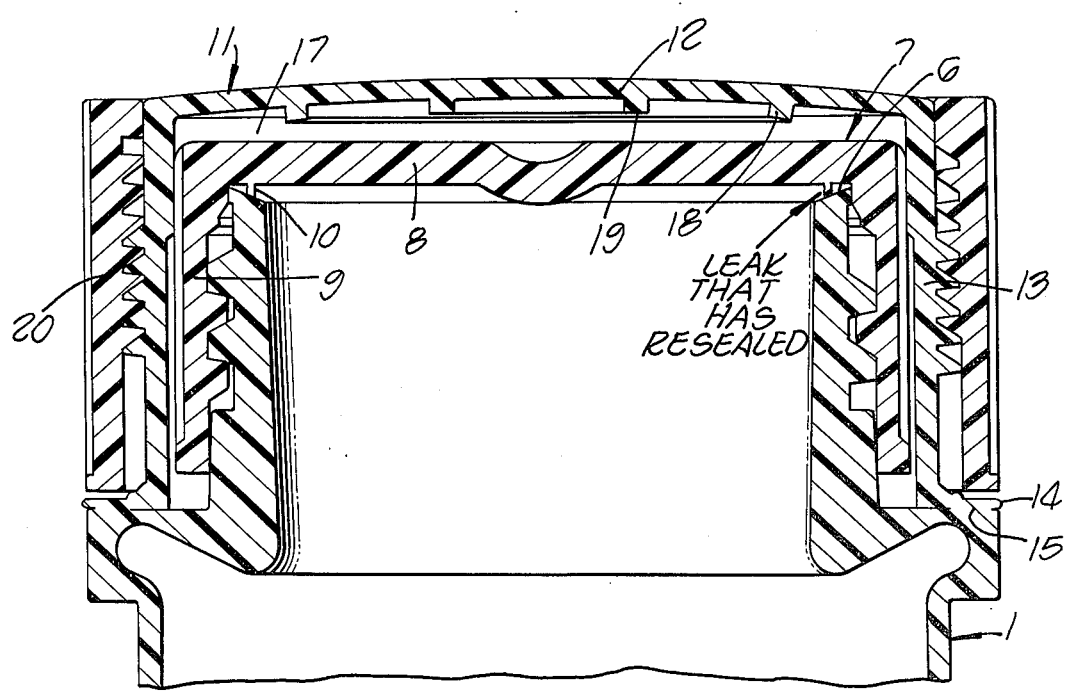
FIG. 4 is an enlarged sectional view showing the outer cap structure of FIG. 2 after sterilization when there has been a temporary inner closure seal failure.

Referring to these drawings the thermoplastic container is shown generally as 1 in FIG. 1. This container has a base 2 with an indented hanging tab 3 for supporting the container in a mouth downward position, such as the administering intravenous solutions. At a top of the container is a dispensing neck 4 and a closure system generally indicated as 5. This container contains sterile medical liquids such as 5% dextrose, normal saline, sterile water, etc., and is supplied to the hospitals as shown in FIG. 4.

Figure 2:
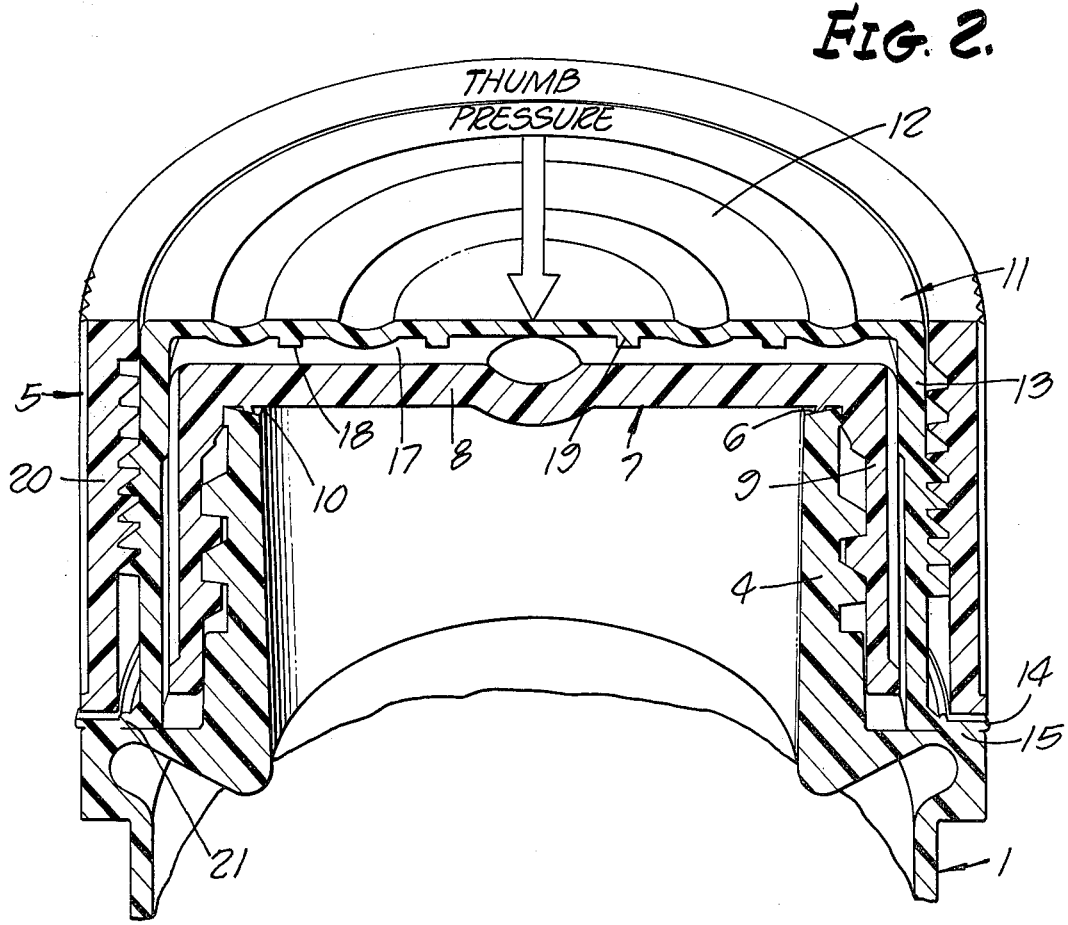
FIG. 2 is an enlarged sectional view taken vertically through the closure system of a first embodiment of the closure system with inner screw cap, showing the outer cap after sterilization when both the inner cap seal and outer cap seal are intact.

This special closure system is shown in more detail in FIG. 2. Here the bottle 1 in a first embodiment is used as a pouring container. Its sterile liquid contents are poured from dispensing neck 4 such as to flush a surgical wound, etc. The pouring container neck 4 terminates in a pouring lip 6. Hermetically sealing off the pouring neck 4 and lip 6 is an inner cap 7, with a top wall 8 and a skirt 9. Skirt 9 and neck 4 have intermeshing threads which squeeze a deformable sealing rib 10 down against dispensing lip 6 to form a hermetic seal at the inner closure.

Fitting over the inner closure and neck of the bottle is an outer closure generally indicated at 11. This outer closure has a top wall 12 and a depending skirt 13. At a bottom end of skirt 13 is a lateral extending frangible brim 14. This brim is heat fused at an annular hermetically sealed joint at 15. In FIG. 2 the outer cap and inner closure are very closely spaced together and define a sealed small volume air space 17. The important top wall 12 of the outer cap 11 is generally flat immediately prior to sterilization and includes a series of concentric internal blocking ribs 18 and 19. Prior to sterilization the bottom surfaces of the blocking ribs 18 and 19 are approximately 0.020 to 0.080 inches (0.51 to 2.1 millimeters) from the top surface of wall 8 of the inner closure. When the liquid filled container and closure systems are subjected to sterilization temperatures of from 240° to 260° F. (116° to 127° C.) at pressures of 35 to 38 psi (24 to 27 gm./mm.²), the thin thermoplastic top wall that is 0.015 to 0.040 inch thick (0.38 mm. to 1.04 mm.) is pushed down against the top wall 8 of the inner closure. When this happens, the top wall deforms into a series of concentric depressions between the blocking ribs 18 and 19. This gives a visual indication that the container has been through the sterilization cycle. Steam sterilization also relieves certain molded in stresses in the outer cap that alters the physical characteristics of the outer cap.

After the container has cooled to room temperature the top wall 12 of the outer cap 11 lifts of the inner closure's top wall 8. This leaves a small distance or gap between the blocking ribs 18 and 19 and the top wall 8 of the innder closure. It has been found that this distance after sterilization ranges from 0.030 to 0.060 inch (0.76 to 1.5 millimeters).

Thumb pressure as shown at FIG. 2 at the center of top wall 12 of the outer closure 11 pushes the thin deflectable top wall downwardly until the blocking ribs 18 and 19 contact the top surface of the top wall 8 of the inner closure. This contact between the two closures can be physically felt. Release of the thumb pressure causes the top wall 12 to spring back to its normal position shown in FIG. 2. This provides a tactile test for checking that there is no leak and the container has been through the sterilization cycle.

Figure 3:
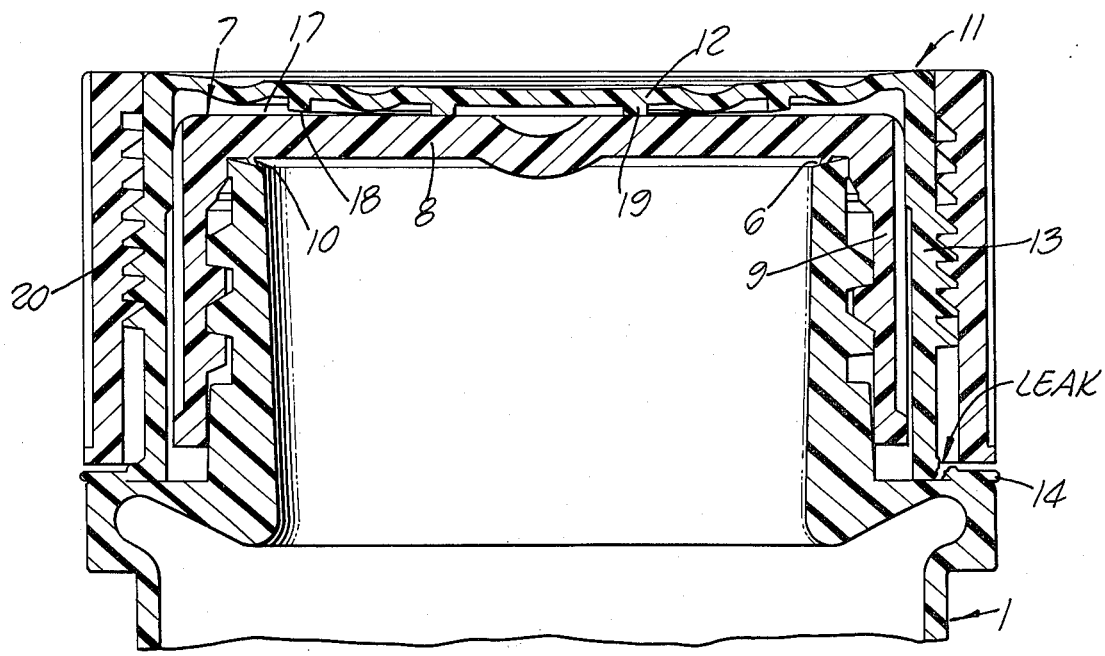
FIG. 3 is an enlarged sectional view showing the outer cap structure of FIG. 2 after sterilization when there has been a leak in the outer cap seal.

When there is an outer cap leak, a permanent inner cap leak, or a temporary inner cap leak, the manner in which the outer cap reacts to pressure will indicate these different types of seal failure. These will be explained as follows:

a. Outer Cap Leak. If there is a leak in the outer cap seal, the top wall of the outer cap will be sucked down against the inner closure and will not yield to thumb pressure (FIG. 3).

b. Permanent Inner Closure Leak. When there is a permanent inner closure leak such as a broken portion of sealing rib 10, the outer cap gives both a visual and a tactile indication of this. Visually the outer cap's top wall appears generally as it did before sterilization. The annular depressed areas between ribs 18 and 19 are shown in FIG. 2, are not present when there is a permanent inner cap leak. Tactically thumb pressure on the outer cap's top wall lacks the springy return from contact with the inner cap. This is because pressure is equalized between the two caps and the bottle's interior. Since the bottle has an air space above its liquid contents that is many times greater than the volume between the two caps, the bottle acts as a large volume air reservoir communicating with the space between the two caps. This air reservoir is at approximately atmospheric pressure and pushing the outer cap's top wall into contact with the inner cap's top wall causes insignificant compression of air between the caps.

c. Temporary Inner Cap Leak. When there is a temporary leak at the inner cap that has subsequently resealed the outer cap's top wall takes on an outwardly bulged configuration as shown in FIG. 4. This situation would occur when there was a very slight leak at sealing rib 10 prior to sterilization. During sterilization pressures within the bottle would build up as the bottle is steam autoclaved at 240° to 260° F. After steam sterilization, cooling of the container and closure system of FIG. 4 causes sufficient shrinkage of the inner cap to reseal rib 10 against the bottle neck. High pressure air then becomes trapped between the two caps. When the container is removed from the autoclave the overriding pressure external of the bottle that is present during sterilization is no longer surrounding the bottle. Therefore the outer cap bulges up as shown in FIG. 4.

In summary the three conditions mentioned in a, b, and c above, give an indication not only that the bottle is defective but also what kind of defect is present.

In the first four drawings shown in the application, the inner closure has been shown as a screw cap which can be removed for pouring out the liquid contents of the thermoplastic bottle. To gain access to this inner screw cap, the outer cap which is hermetically sealed to the container must first be removed. One method of removing this outer cap is with a jacking ring 20. This jacking ring intermeshes with external threads on the outer cap skirt 9. This jacking ring, explained in our co-pending United States application entitled "Double Screw Cap System for Sterile Medical Liquid Container and Method of Opening Same", Ser. No. 338,671, fractures the outer cap at an annular frangible section 21.

Once removed the outer cap exposes the inner screw cap which can be physically unscrewed from the bottle neck and the liquid contents poured into a surgical wound or the like.

Figure 5:
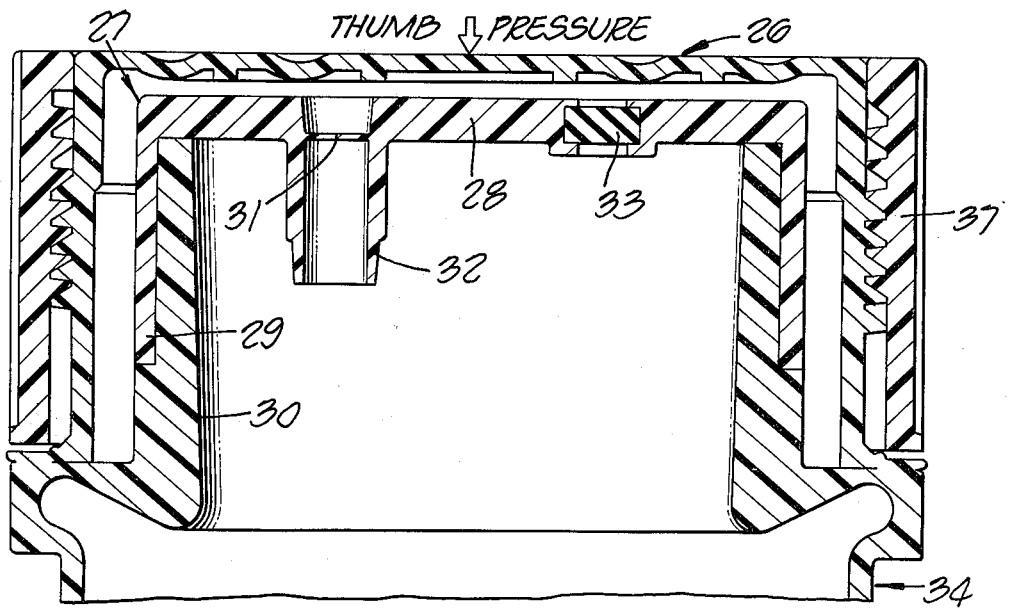
FIG. 5 is an enlarged sectional view of a second embodiment showing the outer cap combined with an inner closure adapted for connecting to an administration set for intravenously feeding a patient.
Figure 6:
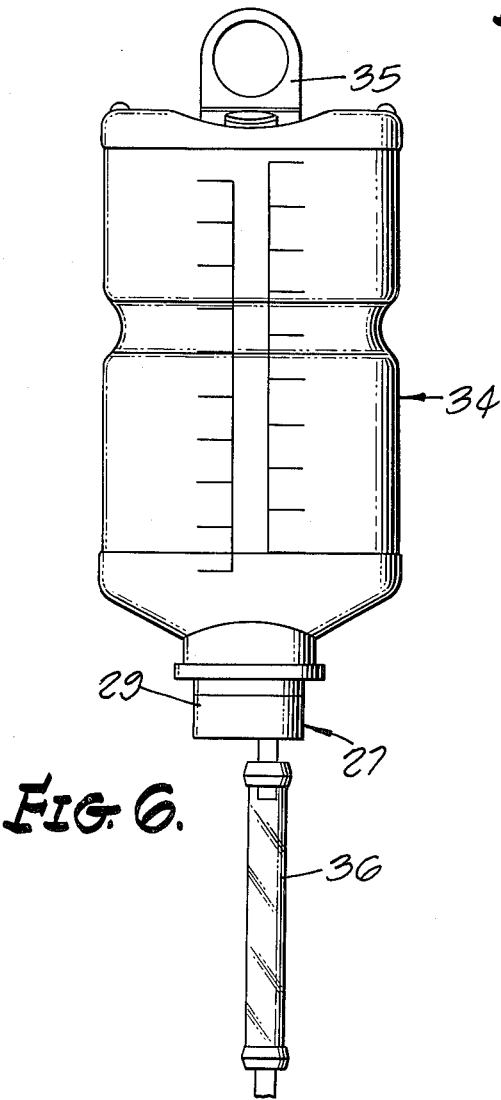
FIG. 6 is a front view of the thermoplastic container with the inner closure of FIG. 5 connected to a medical administration set.

In FIG. 5 a second embodiment of the invention is shown. Here the outer cap 25 is identical to the outer cap 11 of FIG. 2. However, the inner closure 27 in FIG. 5 is different. This inner closure has a transverse top wall 28 and a short depending skirt 29 or other means which is permanently bonded or fused to the dispensing neck 30 of the FIG. 5 embodiment. Located within transverse wall 28 is a puncturable diaphragm 31 and a surrounding sleeve 32. After the outer cap has been removed a puncturing spike from an administration set can puncture diaphragm 31 and be gripped by sleeve 32. This type structure of the entrance port for coupling with an administration set is shown schematically and other type connections can be employed. Also, if desired, the transverse wall 28 can include a resilient or rubber puncturing pad 33 for injecting additive medications.

In the second embodiment shown in FIG. 5 the thermoplastic container 34 is shown hanging in a mouth downward position from a hanging tab 35. The outer cap has been removed and a puncturing spike of an administration set 35 has been inserted through the inner closure.

The tactile sterility indicator operates the same in FIG. 5 as it does in FIG. 2. Likewise a threaded jacking ring 37 can be used to break apart the outer cap 26.

The tactile sterility indicator of the double closure system of this invention works exceptionally well when the outer cap is injection molded of a propylene — ethylene copolymer theremoplastic material and the bottle is likewise of a propylene — ethylene copolymer theremoplastic material. These copolymers, called pollyallomers, are marketed by Eastman Chemical Company under the name TENITE. This material provides an easily controllable fusion joint at the fracture point of the outer cap and also top wall of the outer cap is permanently deformable at steam sterilization temperatures and pressure. The jacking ring can be of a rigid theremoplastic, thermosetting, or metal material.

In the foregoing specification specific embodiments have been used to describe this invention. However, those persons skilled in the art will understand how to make certain modifications to these embodiments without departing from the spirit and scope of the invention.

We claim:

1. A container with inner and outer closure for storing and dispensing sterile liquids, which includes a blow molded thermoplastic container with a dispensing outlet, and the container and outer closure forming a unit that has a transverse abutment means surrounding the outlet wherein the improvement comprises:

the inner closure secured to the container to close off the outlet and form a hermetically sealed enclosure, said inner closure having at least a portion that is openable for dispensing; and a separately formed thermoplastic outer cap with a longitudinal axis, which outer cap is hermetically sealed to the enclosure with a bacteria-tight bound proximate said abutment means, said outer cap having a manually deflectable top wall physically spaced a predetermined distance from the inner closure so that said wall can be deflected a sufficient amount by thumb pressure to cause the outer cap and inner closure to contact each other for a tactile determination of the integrity of the outer cap and inner closure; and said outer cap has both a thin frangible section proximate said abutment means and externally exposed threads with the threads of the outer cap being in a axial alignment with the abutment means, whereby said threads can receive a threaded opening member and guide it toward the abutment means for exerting a pressure against the abutment means to axially pry the outer cap apart at its frangible section.

2. The combination as set forth in claim 1 wherein the outer cap's top wall has at least one blocking rib extending inwardly from an inner surface of said top wall.

3. The combination as set forth in claim 2 wherein there are a plurality of concentric rings of blocking ribs extending inwardly from an inner surface of the outer cap's top wall.

4. The combination as set forth in claim 1 wherein there is an internally threaded jacking ring threadingly disposed on the outer cap for rupturing the cap by exerting an axial force between the outer cap threads and the abutment means.

5. The combination as set forth in claim 1 wherein the outer cap has a deflectable top wall sufficiently flexible so as to balloon up into a visible crown when there is a temporary leak that has resealed between the inner closure and the container and the unit is sterilized at 240° to 250° F. at 35 to 38 psig.

6. The combination as set forth in claim 1 wherein the outer cap has a top wall sufficiently thin so as to permanently deflect and deform into permanent contact with the inner closure upon a leak in the outer closure, and the unit is sterilized at 240° to 260° F. at 35 to 38 psig.

7. The combination as set forth in claim 1 wherein the outer cap has a top with a wall thickness of 0.015 to 0.040 inch.

8. The combination as set forth in claim 1, wherein the deflectable portion is spaced 0.030 to 0.060 inch from the inner closure.

* * * * *